C. O. BLEE & J. C. HELMKAMP.
ARTIFICIAL FISH BAIT.
APPLICATION FILED AUG. 5, 1912.

1,056,494.

Patented Mar. 18, 1913.

WITNESSES

INVENTORS
CHARLES O. BLEE
JOHN C. HELMKAMP
BY
Attorney.

UNITED STATES PATENT OFFICE.

CHARLES O. BLEE AND JOHN C. HELMKAMP, OF FORT WAYNE, INDIANA.

ARTIFICIAL FISH-BAIT.

1,056,494.  Specification of Letters Patent.  Patented Mar. 18, 1913.

Application filed August 5, 1912. Serial No. 713,335.

*To all whom it may concern:*

Be it known that we, CHARLES O. BLEE and JOHN C. HELMKAMP, citizens of the United States, residing at Fort Wayne, in the county of Allen and State of Indiana, have invented certain new and useful Improvements in Artificial Fish-Bait, of which the following is a specification.

This invention relates to artificial bait for trolling and casting, and its object is to provide a bait which will float on top of the water and which can be submerged in the water if desired. The bait body is hollow and is adapted to be filled with water if it is to be submerged, the flow of water into the bait body being controlled by a valve mechanism. The valve mechanism can be locked in closed position if the bait is not to be submerged but is to remain on top of the water.

In order that the invention may be better understood, reference is had to the accompanying drawing, in which—

Figure 1:
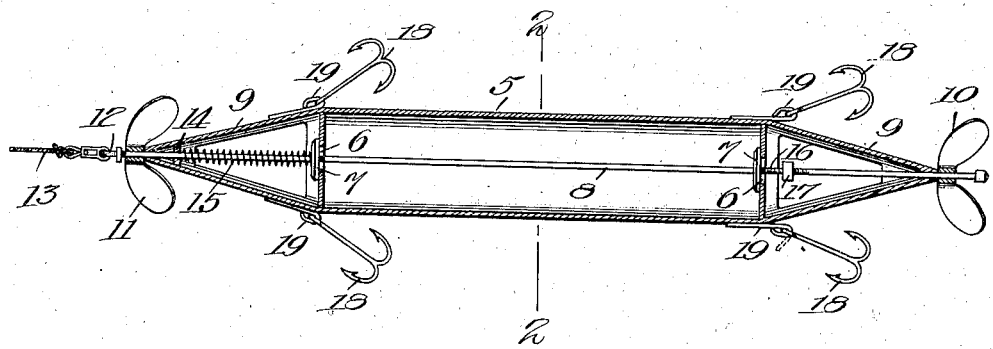
Figure 2:
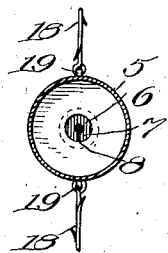

Figure 1 is a plan view of the bait, partly in section. Fig. 2 is a cross-section on the line 2—2 of Fig. 1.

Referring specifically to the drawing, 5 denotes the bait body, the same being hollow and having any suitable shape, perfectly elongated as shown. In the front and rear ends of the body 5 are central openings 6 which are provided with valves 7 carried on a rod 8 extending centrally and longitudinally through the body. At each end of the body are conical extensions 9 which are open at the sides so that the water may flow through the openings 6 into the body when the valves 7 are open. The rod 8 passes through the apex of the extensions and behind the rear extension carries a spinner 10. In front of the forward extension, the rod carries a spinner 11, and an eye 12 to which the line 13 is connected. Around the rod, between the front valve and a cross-bar 14, is coiled a spring 15 which serves to normally hold the said valve, as well as the rear valve, closed. The rod passes loosely through the cross-bar 14, and the latter is carried by the front extension 9. The rear end of the rod 8 has a screw-threaded portion 16 on which is mounted a nut 17 which is adapted to be screwed against the rear end of the body 5 to hold the valves closed. The valves open when the rod is pulled forward, in view of which it will be evident that the valves are locked in closed position when the nut 17 is screwed against the rear end of the body 5. If the valves are to open, the nut is backed, which releases the rod and allows it to be pulled forward to open the valves.

The body 5 carries hooks 18 at its front and rear ends. Each of these hooks is connected to the body by a clip 19 fastened to the latter and having a resilient portion which is adapted to be passed through the eye of the hook and pressed down toward the body of the clip. By this means the hook can be readily attached or removed.

In operation, when the bait is drawn in after being cast, the valves 7 open and admit water into the bait body causing it to sink deeper into the water, and as soon as it is lifted out of the water for the next cast, the water will run out of the bait body through the rear opening 6, the weight of the bait body causing it to slide down on the rod away from the valves. When the bait is cast and strikes the water, the line being slack, the spring 15 holds the valves closed until the line is given a pull, whereupon the valves open and admit water into the body to submerge the bait. If it is desired that the bait remain on top of the water, the nut 17 is operated to lock the rod 8 as hereinbefore described. If a heavy bait is desired enough water may be admitted to give the required weight, after which the nut 17 is operated to hold the valves closed.

We claim:

1. An artificial bait comprising a hollow buoyant body having water inlets, valves controlling said inlets, and a line for controlling the body, said line being operatively connected to the valves.

2. An artificial bait comprising a hollow buoyant body, a line for controlling said body, and means actuated by said line for admitting water into the body to submerge the same.

3. An artificial bait comprising a hollow buoyant body having water inlets, a rod passing loosely through the body, valves carried by the rod and controlling the aforesaid inlets, and a line connected to the rod.

4. An artificial bait comprising a hollow buoyant body having water inlets, a rod passing loosely through the body, valves carried by the rod and controlling the aforesaid inlets, a line connected to the rod, and means for locking the rod to hold the valve closed.

5. An artificial bait comprising a hollow buoyant body having water inlets, a rod passing loosely through the body, valves carried by the rod and controlling the aforesaid inlets, a line connected to the rod, and resilient means for moving the rod in a direction to close the valves.

6. An artificial bait comprising a hollow buoyant body having water inlets, a rod passing loosely through the body, and projecting from the ends thereof, spinners mounted on the projecting ends of the rod, valves carried by the rod and controlling the aforesaid inlets, and a line connected to the rod.

7. An artificial bait comprising a hollow buoyant body having water inlets, a rod passing loosely through the body, valves carried by the rod and controlling the aforesaid inlets, a line connected to the rod, and a nut screwed on the rod and adjustable to engage the body to lock the rod against movement in a direction to open the valves.

8. An artificial bait comprising a hollow buoyant body having water inlets, valves controlling said inlets, and a hauling line operatively connected to the valves.

In testimony whereof we affix our signatures in presence of two witnesses.

CHARLES O. BLEE.
JOHN C. HELMKAMP.

Witnesses:
ELMER WEISTHORN,
H. J. TAYLOR.